UNITED STATES PATENT OFFICE.

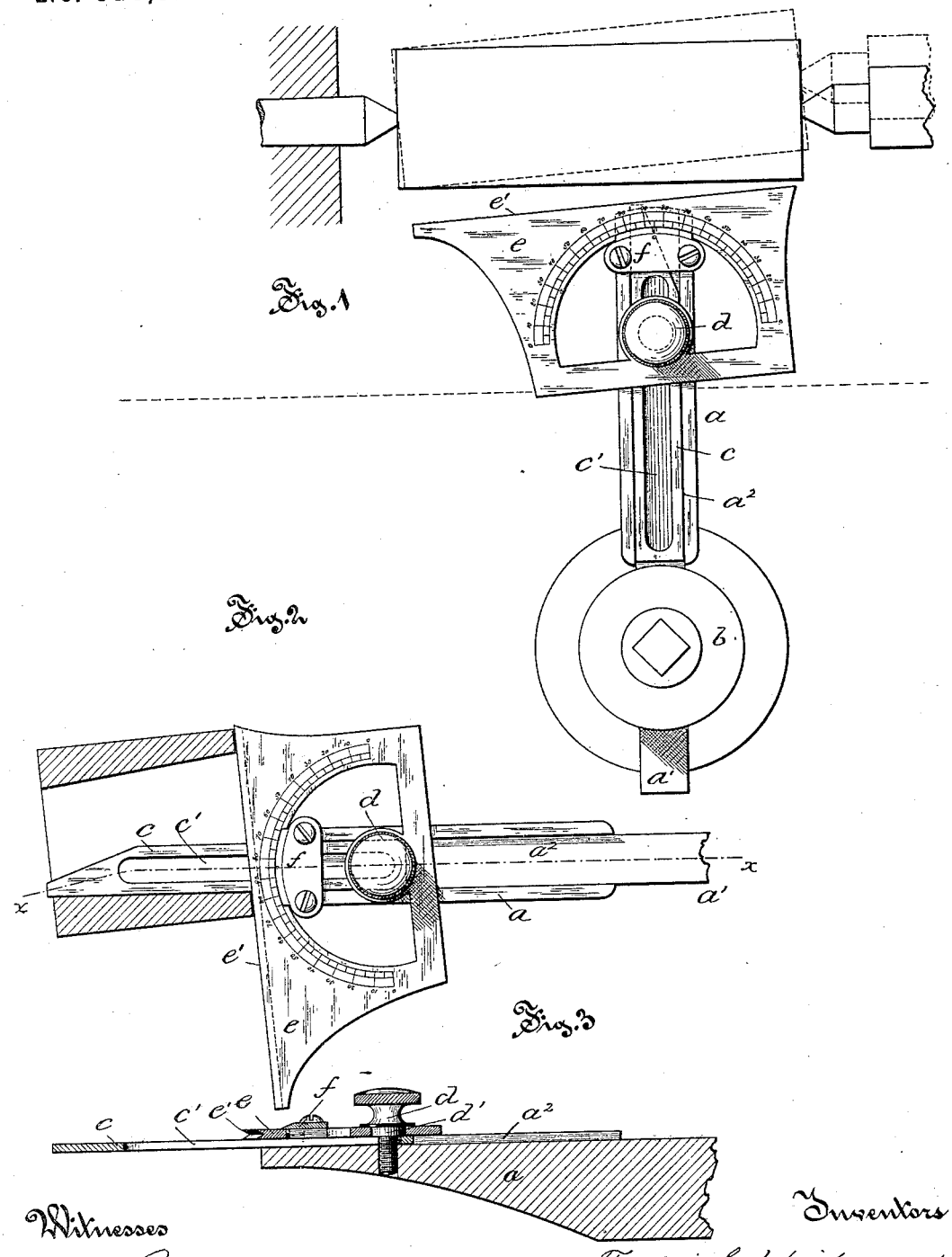

FREDERICK WAITE AND FREDERICK H. TIDGEWELL, OF HARTFORD, CONN.

TAPER-MEASURING TOOL.

SPECIFICATION forming part of Letters Patent No. 318,526, dated May 26, 1885.

Application filed December 29, 1884. (No model.)

*To all whom it may concern:*

Be it known that we, FREDERICK WAITE and FREDERICK H. TIDGEWELL, both of the city and county of Hartford, and State of Connecticut, have invented certain new and useful Improvements in Taper-Measuring Tools, of which the following is a description, reference being had to the accompanying drawings, where—

Figure 1 is a plan view of our improved device, shown as held in the tool-post of a lathe and with the working edge of the plate set at an angle with the axis of the holder. This figure also shows the centers of a lathe and a piece of work held between those centers. Fig. 2 is a plan view of the device, illustrating the method of using it to measure the taper of a hole in a body, part of the shank being broken away. Fig. 3 is a view in vertical cross-section through the tool on plane denoted by line $x\ x$ of Fig. 2.

The object of our invention is to provide a simple and compactly arranged device suitable for use on a lathe or like machine tool for the purpose of measuring the taper of a piece of work, or for setting work in a lathe or other tool on the proper taper to which it is desired to cut the same.

Our invention consists in a holder having a shank that is of proper outline to be held in the socket of a tool-post that bears an extensible blade, which may be projected beyond the front end of holder, and also bears a swinging or pivoted plate, the front edge of which is straight to form the working-edge. The plate also has a graduated arc, and in common with the blade may be held in place by a clamp device.

In the accompanying drawings, the letter $a$ denotes the body of the tool that is preferably of metal, as steel, and has a shank, $a'$, of a cross-section that enables it to be placed and held securely in the socket of a tool-post, $b$. The body bears an extensible arm, $c$, preferably seated and moving longitudinally in a socket, $a^2$, on the upper side of the holder, the side walls of the socket serving as guides to hold the edges of the blade in a given line as it moves in and out of the socket. The blade has a longitudinal slot, $c'$, along its center, and through this the clamp-screw $d$ passes into a threaded socket in the body of the holder. This screw has a shoulder, $d'$, that overlaps the slot and bears upon the upper side of the blade, which may be clamped between the holder and the shoulder on the screw. The screw forms a pivot for the plate $e$, which is located upon the upper side of the holder over the blade, and has a working-edge, $e'$, that slightly overhangs the front end of the holder. The central portion of the plate is preferably cut away, and is graduated upon the upper surface to any desired degree of fineness, the graduated arc having as its center the axis of the clamp-screw; and an index-plate, $f$, firmly attached to the holder, bears an index-line, by means of which the angular position of the front edge of the blade may be determined with reference to a vertical plane passing through the center of the holder and the clamp-screw.

It is to be understood that the arc is to be graduated on both sides from a line normal to the front of the working-edge, which line passes through the center of the pivot on which the plate turns.

The method of using our device is as follows: When it is desired to turn a plug of a taper of, say, five degrees, the measuring-tool is clamped in the tool-post of a lathe in such position that the working-edge of the plate (the index being set at zero on the graduated arc) lies parallel to the axis of the lathe. The working-edge of the plate is then turned five degrees out of the line of the axis as measured on the graduated arc, and the tail-block of the lathe then set over until the surface of the work (which has been previously roughed out in the ordinary way) coincides in direction with the edge of the plate, this new position of the tail-block and the work being indicated in dotted outline in Fig. 1. The tool may then be removed from the tool-post, and a cutting-tool inserted in its place with its point of course level with the center of the work. The latter may now be turned in the usual manner, and the resulting surface will be on a taper of five degrees. In Fig. 1 the dotted line nearest the tool-post indicates the position and direction of the nearest edge of the opening in the lathe frame.

In order to measure the taper of a hole in any body, the blade is extended, the clamp-screw tightened, and the blade inserted in the opening and held against the inner surface, while the working-edge of the plate is brought to a bearing on the face of the body on each side of the hole. The degree of taper may then be read off from the graduated arc.

In order to make the tool more sensitive, the working-edges of the plate and of the blade are preferably channeled, and their exact contact with any surface may be more accurately determined.

The front edge of the index-plate $f$ overlaps upon the plate, is beveled, and bears either a vernier or upon each side of the zero line a half-degree mark.

We claim as our invention—

1. As a new article of manufacture, the holder having a shank, a blade extensible beyond the front end of the holder, an angle-plate pivoted to the holder and having a working-edge, a graduated arc, and a clamp device, all substantially as described.

2. In combination, a body or holder having a shank for attaching it to a tool-post, an adjustable angle-plate having a working-face and a graduated arc, and a clamping device, all substantially as described.

3. In combination, a body or holder, $a$, having a shank, $a'$, an angle-plate, $e$, with a channeled working-edge, $e'$, and a graduated arc, an extensible plate, $c$, with a channeled working-edge, and a clamp device, all substantially as described.

FREDERICK WAITE.
FREDERICK H. TIDGEWELL.

Witnesses:
ALBERT C. TANNER,
H. R. WILLIAMS.